Figure 1:
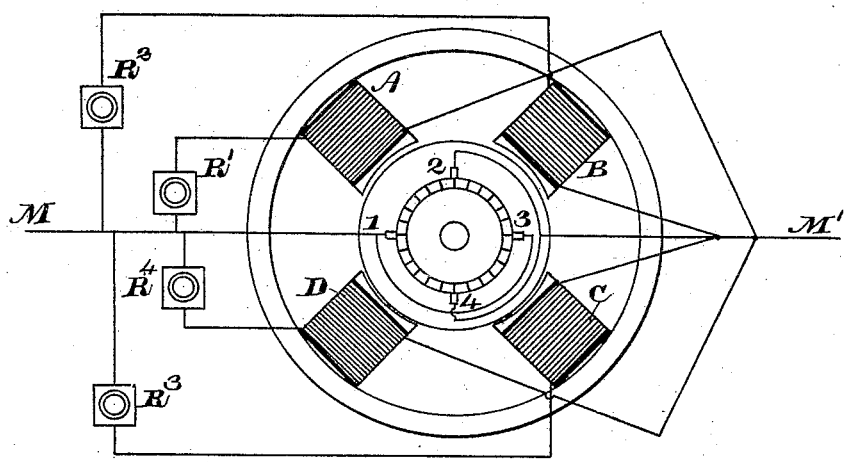

(No Model.)  2 Sheets—Sheet 1.

E. THOMSON.
DYNAMO ELECTRIC MACHINE.

No. 523,696.  Patented July 31, 1894.

WITNESSES—
A. F. Macdonald.
T. J. Johnston

INVENTOR—
Elihu Thomson
by Geo. R. Blodgett,
Atty.

(No Model.)　　　　　　　　　　　　　　　　　　2 Sheets—Sheet 2.
E. THOMSON.
DYNAMO ELECTRIC MACHINE.
No. 523,696.　　　　　　　　　　Patented July 31, 1894.
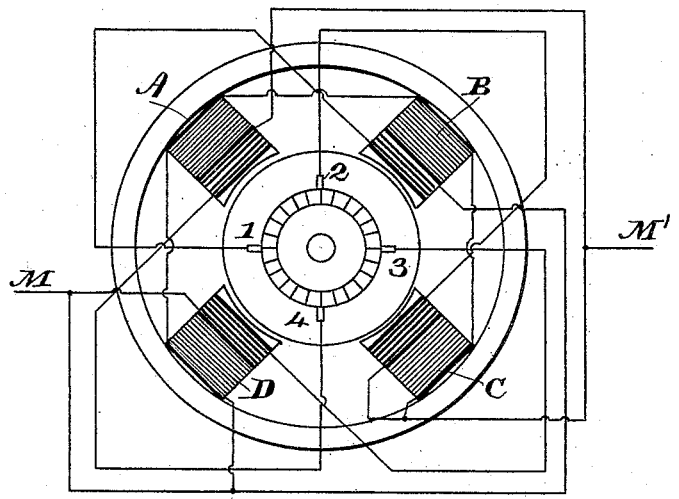
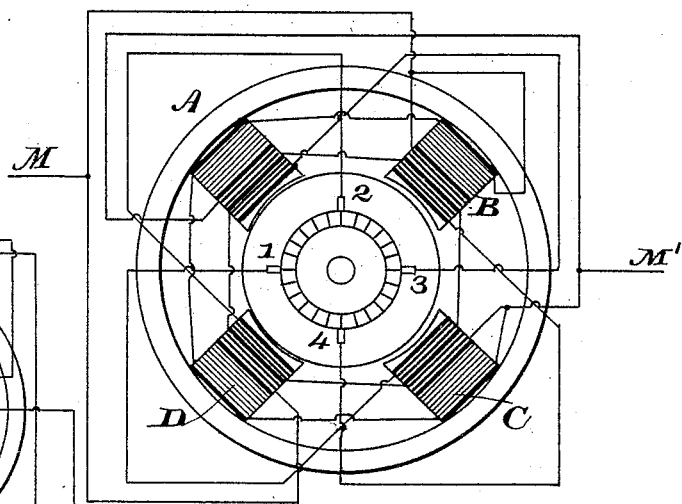
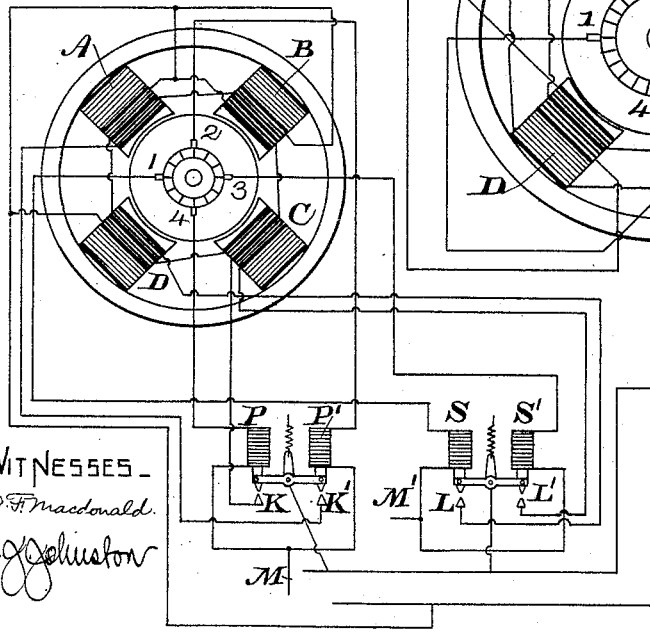
WITNESSES
A. F. Macdonald
S. J. Johnston
INVENTOR
Elihu Thomson
by Geo. H. Blodgett,
Atty.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

DYNAMO-ELECTRIC MACHINE.

SPECIFICATION forming part of Letters Patent No. 523,696, dated July 31, 1894.

Application filed March 19, 1894. Serial No. 504,131. (No model.)

*To all whom it may concern:*

Be it known that I, ELIHU THOMSON, a citizen of the United States, residing at Swampscott, in the county of Essex, State of Massachusetts, have invented certain new and useful Improvements in Dynamo-Electric Machines, of which the following is a specification.

My invention relates to dynamo-electric machinery, and has for its object to provide a method of balancing or equalizing the magnetic action of the field poles in a multipolar dynamo or motor whereby if one of the field poles becomes less active in developing electro-motive forces in the armature, it can be made sufficiently active to balance the effect of the opposite field pole.

It is well known that in multipolar machines it is essential to avoid short-circuits within the armature winding or from one point of the armature to another which may be connected, either through the brushes or through diametrical connections or cross connections on the armature as usual, to maintain equality at the connected points, so that each will contribute its own proportion of current to the working circuit and therefore not allow the load to become unbalanced. This is also important in case the armature gets out of center by the wearing of the journal boxes and thereby comes into closer proximity to some of the field poles than others.

In the drawings, Figures 1 to 5 show diagrammatically various arrangements effecting the purposes of my invention.

Figure 2:
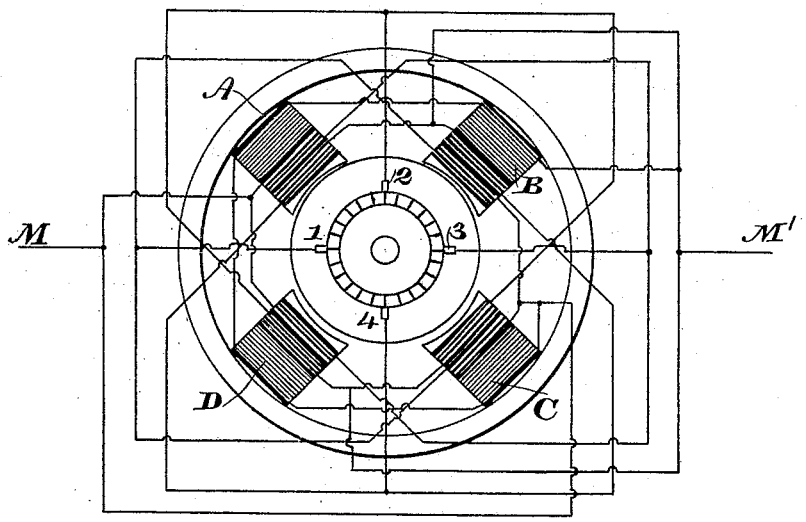

A, B, C, D are four field coils surrounding and magnetizing the field poles on a four pole dynamo. In the field between these poles the armature revolves, and is provided with four brushes, 1, 2, 3, 4, on its commutator, the opposite brushes 1—3, 2—4, being connected up as positive and negative terminals. Now should the electro-motive forces generated between the brushes 1—2 be greater, on account of the superior force of the field pole A, or on account of the greater proximity of the field pole of the revolving structure, the brushes 1—2 will be more active and take a larger proportion of the load than the brushes 3—4, that is, they will be traversed by a larger fraction of the total current, and should the disproportion be very great, there would be danger of short-circuiting of the stronger brushes through the weaker ones. To avoid this I provide the field coils A, B, C, D, with means for adjusting their strengths independently, so as to lower the strength of that pole which is too strong with relation to the others, or to raise the strength of that pole which is weaker in relation to the others, and thereby produce a balance of electro-motive forces between the brushes of low polarity. A simple means of doing this is to excite the field coils or poles either in shunt or by separate excitation, and in the circuit of each coil to include a variable rheostat $R'$, in circuit with A, $R^2$, $R^3$, $R^4$, in circuit with B, C, D respectively. By varying the resistance in circuit a proper balance may be effected for any condition of load whereby equality of delivery from the whole four brushes to the circuit is secured notwithstanding the irregularities of structure or position of the parts. I prefer however to make the operation as far as possible automatic, in such a way for example, as shown in Fig. 2. Here the field coils are compound in that a suitable section of each coil A, B, C, D, is either in shunt across the mains M, M' or separately excited. The remainder of the winding is a series winding.

As shown, there are two coils of coarse wire or series turns, on each of the poles, and they are connected as follows: and furnish at the same time a compounding of the magnetism of the poles while compensating for inequalities of action of the poles in generating an electro-motive force in the section of the armature immediately exposed thereto. Brush 1 is connected in series through coils on B and C, one coil on each; the connection made through these coils may be either in series or in multiple arc, according as their resistances and magnetizing turns are selected. After passing through the coarse coils on B and C from the brush 1, current goes to main M, as can easily be traced in the figure. In like manner brush 3, which is of like polarity to brush 1, is connected through a coarse coil on A and D, and then to M. Thus four of the coarse coils are connected. The other four are connected in a similar way to the other brushes; that is, a connection is taken from brush 2 through a pair of coarse coils on C and D and thence to M', the other main, while a connection from brush 4 goes through a coarse coil on A and B and to M'. Any excess of current which leaves a brush must pass, before reaching the mains or terminals of the machine, through coils on the opposite field poles, thus strengthening them and tending to correct the inequalities of current taken up by the brushes by strengthening the weaker parts of the field. At the same time, the combined action of all the coarse coils is to compound or raise the magnetic state of the field poles under load.

Of course it would be within the scope of my invention to compound the field poles in the ordinary way by taking the whole current through compounding coils and arrange the compensating coils, connected individually, as supplementals.

A less desirable arrangement than that shown in Fig. 2 is shown in Fig. 3, where the connection from the coarse winding is from brush 1 to the coarse winding on B, and then to M; from brush 2 to the coarse winding on C, and then to M'; from brush 3 to the coarse winding on D and then to M, and from brush 4 to the coarse winding on A, and then to M'. This tends to cause a general increase of the strength of the poles opposite to those which are generating, at any time, an excess of electro-motive force in the armature, and therefore tend to compensate for any lack of centralization of the armature, or disturbances of strength of the field poles themselves, which should be equal.

In Fig. 4 the connections are modified from those shown in Fig. 2, in that the coarse coils on C and B respectively are connected in series from the brush 1 to the terminal M; coarse coils on C and D respectively are connected in series from brush 2 to M'; from brush 3 in like manner through coarse coils on A and D to M; and from brush 4 in like manner, through coarse coils on A and B to M'.

Instead of the currents taken up from the brushes being used to change the strength of the magnetic field poles, the current taken up from any brush may indirectly be made to increase or decrease the current fed to the compensating field coils. Thus, in a circuit taken directly from the brushes 1 and 3, individually, may be placed electro-magnet coils S, S' respectively, the currents from the two brushes after passing such coils uniting in multiple on the main M'. In like manner brushes 2 and 4 respectively may connect to the main M through electro-magnet coils P, P'. These pairs of coils serve to control contacts K, K', L, L', which contacts when closed or opened govern the flow of current to the coils on the poles for balancing the actions of the current, and the field coils may be fed either from the machine itself or from a separate source, as by connections $M^3$ and $M^4$. For example, if the current from the brush 1 is excessive the electro-magnet S is strongly energized and attracts its armature, or pulls its core, against the action of S', and closes a contact at L', as is evident from the construction, where the coils S, S' are fixed in position and have movable cores balanced upon a pivot between them. By this closure of L' a circuit is made from $M^3$ through L' and to a coil on the field core C, and from that to a coil on field core B, thence to a return circuit to $M^4$. If the currents leaving the brushes 1 and 3 be equal in amount, the electro-magnet coils S, S' are equal in pull and the contacts L, L' may remain open, by the cores taking a central position, as shown in the figure. If however the current from the brush 3 becomes excessive, the contact at L would be closed and current from $M^3$ would pass through L and through a coil on D and A before returning to $M^4$. In like manner the currents from brushes 2 and 4 would operate upon the mechanism of which P and P' are the electro-magnets and K and K' the contacts, similarly connected, so that on the closure of K, coils on C and D are put into circuit, and on the closure of contact K' coils on the field cores A and B are put into circuit. If the contacts instead of introducing current in a direction to strengthen the magnets of the machine, passed a current in the opposite direction, or to weaken the magnets, then the cores which would be affected by the current being excessive on a particular brush, would be those diametrically opposite to the ones named in the above description, that is, instead of A, B, the coils on the field affected would be those on C and D, with a reversed or differential current passing.

Fig. 5 is diagrammatic, the figure not showing details of working apparatus, as arrangements would be introduced to put on the currents very gradually, using the coils S, S' or P, P', as relays, and arrangements, where the currents are of considerable strength, would be provided to avoid sparking at the contacts, &c.

What I claim as new, and desire to secure by Letters Patent of the United States, is—

1. The method of equalizing the potential of armatures running in multipolar fields, which consists in varying the inductive action of the field-magnet poles in accordance with the variations in potential, substantially as described.

2. The method of equalizing the potential of the current in armatures running in multipolar fields, which consists in strengthening the inductive action of the weaker poles by current taken from the part of the armature generating the higher potential.

3. The method of equalizing the potential of armatures running in multipolar fields, which consists in varying the magnetism of the poles proportionately to the variations of electro-motive force generated in the armature by the different degrees of proximity of the field-magnet poles to such armature.

4. In a compound multipolar dynamo-electric machine or motor and as a means of equalizing the potential of the currents generated in the armature, series windings adapted to vary the magnetism of the poles to compensate for the greater proximity of the armature to one or more of such poles, substantially as set out.

5. In a dynamo-electric machine, as a means of equalizing the potential of the armature, a series winding adapted to increase the magnetization of the poles to which the armature runs in least proximity, in accordance with the increased electro-motive force developed in such armature by its proximity to the other poles.

6. In a dynamo-electric machine having a number of pairs of poles, a multiple-wound armature, field-magnets and series windings thereon arranged and adapted, as herein described, to adjust the strength of the weaker poles in accordance with the increase of electro-motive force generated in the armature by its approximation to other poles.

7. In a multipolar dynamo-electric machine or motor, a multiple-wound armature, series windings upon the field-magnet poles taking current from such multiple-wound armature, and means, substantially as described, adapted to equalize the inductive action of such field-magnet poles upon the armature.

8. In a multipolar dynamo-electric machine or motor, a multiple-wound armature, series windings upon the field-magnet poles, and separate rheostats adapted to adjust the respective strengths of the various poles, substantially as herein set out; whereby the inductive action of each field-magnet pole may be adjusted to maintain equality of potential in the armature.

In witness whereof I have hereunto set my hand this 16th day of March, 1894.

ELIHU THOMSON.

Witnesses:
JOHN W. GIBBONEY,
FRANK HOLDEN.